United States Patent
Breton et al.

(10) Patent No.: US 8,254,409 B2
(45) Date of Patent: Aug. 28, 2012

(54) USER ISOLATION BETWEEN NETWORK DEVICES

(75) Inventors: Nicolas Breton, San Ramon, CA (US); Parixit Gokhale, San Jose, CA (US); Sundher Narayanaswamy, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 329 days.

(21) Appl. No.: 12/628,540

(22) Filed: Dec. 1, 2009

(65) Prior Publication Data

US 2011/0128970 A1    Jun. 2, 2011

(51) Int. Cl.
*H04L 12/66* (2006.01)

(52) U.S. Cl. ........ 370/463; 370/222; 370/242; 370/250; 709/249; 709/250; 398/3

(58) Field of Classification Search ........................ None
See application file for complete search history.

(56) References Cited

U.S. PATENT DOCUMENTS

| | | | |
|---|---|---|---|
| 6,269,452 B1 | 7/2001 | Daruwalla et al. | |
| 6,430,700 B1 | 8/2002 | Daruwalla et al. | |
| 6,615,362 B1 | 9/2003 | Daruwalla et al. | |
| 6,775,295 B1 | 8/2004 | Lothberg et al. | |
| 6,820,210 B1 | 11/2004 | Daruwalla et al. | |
| 6,983,332 B1 | 1/2006 | Lou et al. | |
| 7,050,398 B1 | 5/2006 | Lee | |
| 7,095,741 B1 | 8/2006 | Joshi et al. | |
| 7,184,402 B1 | 2/2007 | Sharma et al. | |
| 7,233,571 B1 | 6/2007 | Krishnamurthy et al. | |
| 7,269,169 B1 | 9/2007 | Venkataraman et al. | |
| 7,342,877 B1 | 3/2008 | Ervin et al. | |
| 7,512,065 B1 | 3/2009 | Phadnis et al. | |
| 7,515,535 B2 | 4/2009 | Finn | |
| 7,539,198 B1 | 5/2009 | Truong et al. | |
| 2003/0165119 A1* | 9/2003 | Hsu et al. ....................... 370/258 |
| 2005/0005029 A1* | 1/2005 | He et al. ........................ 709/249 |
| 2005/0073958 A1 | 4/2005 | Atlas et al. | |
| 2005/0160180 A1 | 7/2005 | Rabje et al. | |
| 2005/0180465 A1 | 8/2005 | Srinivasan et al. | |
| 2006/0245435 A1 | 11/2006 | Sajassi | |

(Continued)

OTHER PUBLICATIONS

Copenheaver, Blaine R., PCT Notification of Transmittal of the International Search Report and the Written Opinion of the International Searching Authority, or the Declaration, International Appl. No. PCT/US2010/003040, International Filing Date Nov. 24, 2010, dated Jan. 26, 2011, 9 pages.

*Primary Examiner* — Kibrom T Hailu
(74) *Attorney, Agent, or Firm* — Cesari and McKenna, LLP

(57) ABSTRACT

In one embodiment, a network device may have its network interfaces identified as either network-to-network interfaces (NNIs) configured to communicate with other network devices in a first computer network, or user-to-network interfaces (UNIs) configured to provide service to the first computer network for user devices. Based on determining at least one NNI for forwarding upstream traffic to an aggregation device of the first network that connects the first network to a second network, any NNI that is not used for forwarding upstream traffic is deemed a novel "NNI alternate" (NNI-ALT). The forwarding of traffic at the network device may be controlled to provide user isolation between network devices by denying traffic forwarding between UNIs and NNI-ALTs as well as between NNI-ALTs and NNI-ALTs, while permitting traffic forwarding between NNIs and NNI-ALTs.

21 Claims, 6 Drawing Sheets

U.S. PATENT DOCUMENTS

| | | |
|---|---|---|
| 2006/0245439 A1 | 11/2006 | Sajassi |
| 2006/0262798 A1 | 11/2006 | Joshi et al. |
| 2007/0014290 A1 | 1/2007 | Dec et al. |
| 2007/0076607 A1 | 4/2007 | Voit et al. |
| 2007/0263640 A1 | 11/2007 | Finn |
| 2008/0181110 A1 | 7/2008 | Ramakrishnan et al. |
| 2008/0239943 A1* | 10/2008 | Hauenstein et al. .......... 370/216 |

* cited by examiner

USER ISOLATION BETWEEN NETWORK DEVICES

TECHNICAL FIELD

The present disclosure relates generally to computer networks, and, more particularly, to user isolation between switches, e.g., in ring topologies.

BACKGROUND

Subscriber (or user) devices, such as broadband subscribers (e.g., metro Ethernet), are often connected to a computer network via a service provider's access network that collects residential and business subscriber traffic, e.g., often a ring topology. For security purposes, it is generally expected for traffic to be controlled in an access network so that subscriber-to-subscriber communication is prevented.

Service providers have used various methods, as well as various technologies and protocols for isolating broadband subscribers. For instance, certain devices may implement a UNI/NNI functionality, where traffic is forwarded based on its type: traffic coming on a user-to-network interface (UNI) is forwarded only to network-to-network interfaces (NNIs). While this isolates subscribers on a same network device, it is not appropriate for subscriber isolation across multiple devices. Network devices may also be configured to implement a Private VLAN (virtual local area network) functionality to provide the desired traffic control across multiple devices; however certain limitations apply to implementing PVLANs, such as where certain hardware configurations do not allow for the use of PVLANs.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a network device may have its network interfaces identified as either network-to-network interfaces (NNIs) configured to communicate with other network devices in a first computer network, or user-to-network interfaces (UNIs) configured to provide service to the first computer network for user devices. Based on determining at least one NNI for forwarding upstream traffic to an aggregation device of the first network that connects the first network to a second network, any NNI that is not used for forwarding upstream traffic is deemed a novel "NNI alternate" (NNI-ALT). The forwarding of traffic at the network device may be controlled to provide user isolation between network devices by denying traffic forwarding between UNIs and NNI-ALTs as well as between NNI-ALTs and NNI-ALTs, while permitting traffic forwarding between NNIs and NNI-ALTs.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

A Metro Ethernet is an example computer network that is based on known Ethernet technologies (e.g., typically deployed in a metropolitan area), and is commonly used for access networks that connect subscribers and businesses to a larger server network or WAN (e.g., the Internet). A typical access network is a collection of Layer 2 and/or Layer 3 switches (and/or routers) in a topology arranged as a ring (open or closed), and may be connected to the WAN (or a service provider core network) by an aggregation network.

Figure 1:
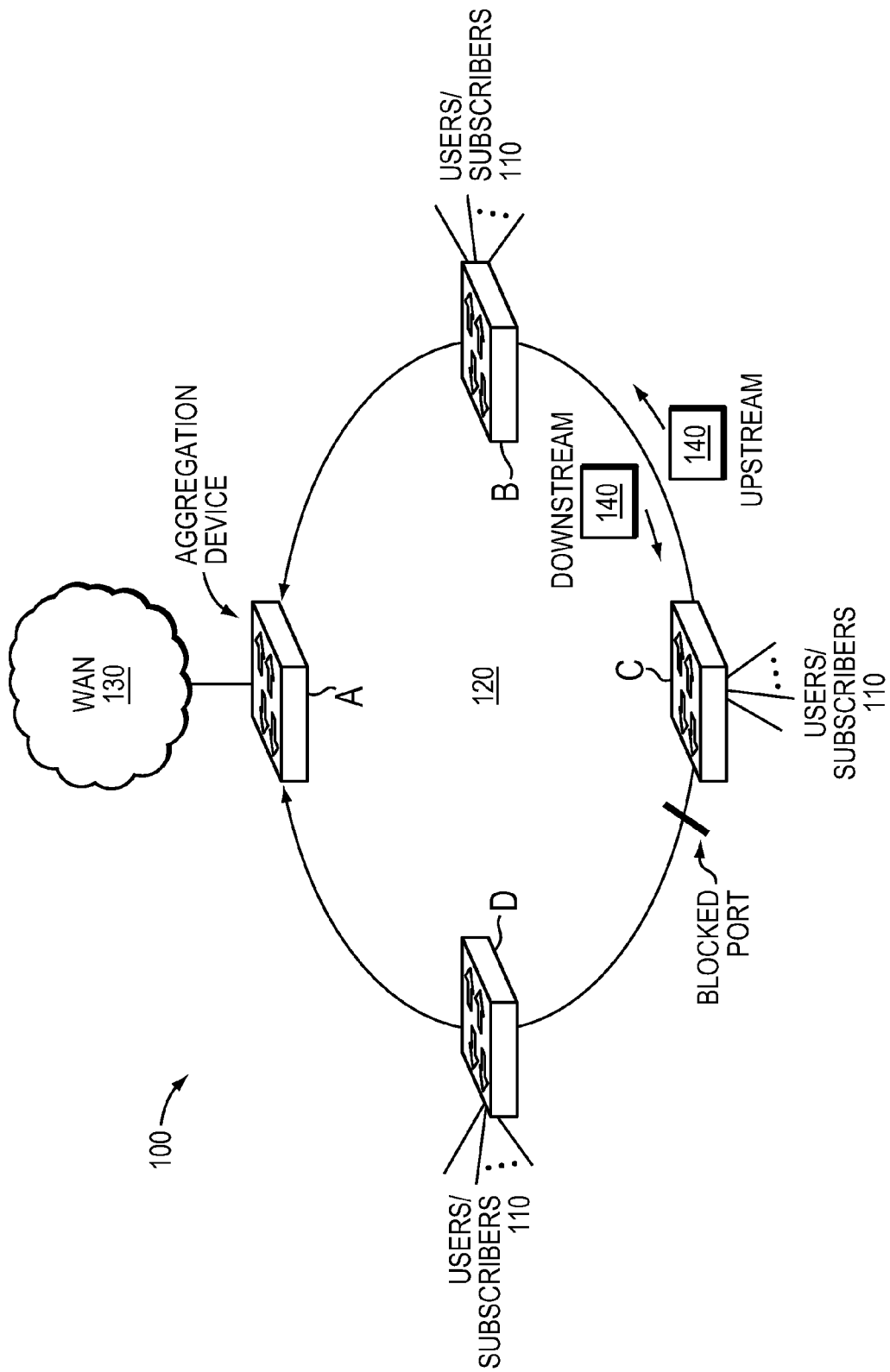
FIG. 1 illustrates an example computer network.

FIG. 1 is a schematic block diagram of an example computer network 100 illustratively comprising nodes/devices, such as one or more switches (or routers) A-D arranged in an illustrative closed ring topology, where switches B-D (e.g., network access devices) may each be interconnected with one or more user (or subscriber) devices 110. The switch A is illustratively an aggregation device, interconnecting the access network 120 to a WAN 130 (or aggregation network, as mentioned above). Those skilled in the art will understand that any number of nodes, devices, links, etc. may be used in the computer network, and that the view shown herein is for simplicity. Also, while the illustrative example refers to an Ethernet ring topology, other network topologies may advantageously utilize the techniques herein, e.g., any network having at least one aggregation device and a plurality of users/subscribers interconnected through access devices.

Data packets 140 (e.g., traffic) may be exchanged among the nodes/devices of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. In particular, service providers often utilize Ethernet technologies (e.g., over fiber optic links) or digital subscriber line (DSL) technology as the foundation for their broadband access networks.

Figure 2:
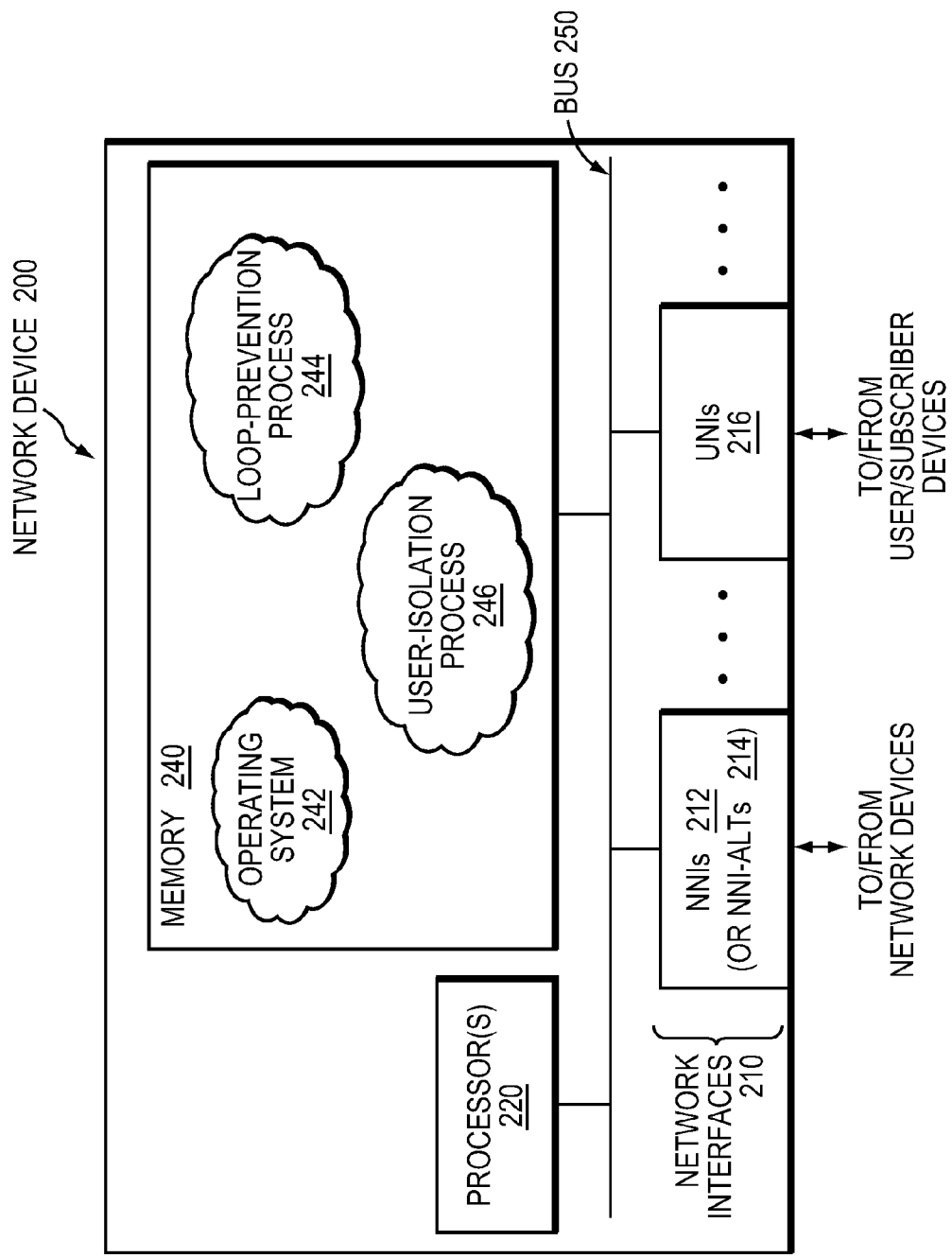
FIG. 2 illustrates an example network device/node.

FIG. 2 is a schematic block diagram of an example node/device 200 that may be advantageously used with one or more embodiments described herein, e.g., as switch (or router) A-D. The device comprises a plurality of network interfaces 210, one or more processors 220, and a memory 240 interconnected by a system bus 250. The network interfaces 210 contain the mechanical, electrical, and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art.

In accordance with one or more embodiments herein, the network interfaces 210, particularly of the access switches, may be classified (identified) as one of either a network-to-network interface (or network-node-interface) "NNI" 212 or a user-to-network interface "UNI" 216 (note that certain UNIs may be configured alternatively as an enhanced network interface, or "ENI" for various reasons not addressed herein though may be appreciated by those skilled in the art). The identification of the interfaces' types may be performed through various measures, such as manually or in response to dynamic protocols, and may be a software classification or hardwired (e.g., physical port-based) distinction.

Generally, an NNI 212 is configured to communicate with other network devices (e.g., switches) in the access network, while UNIs are configured to provide service to the access network for user devices 110. UNIs may be activated on the switch by the service provider in order to allow access to the network for users/subscribers, and as a default behavior isolates users on the same switch from each other. That is, traffic forwarding between UNIs and UNIs is denied on a switch. Subscriber security helps create protection among customers, since using a shared device for multiple customers may allow customers to affect each other otherwise. The UNI/NNI distinction thus creates a circuit-like behavior to separate customers' traffic from each other on the same switch, where traffic forwarding is only permitted between NNIs and UNIs (i.e., downstream from NNIs to UNIs, and upstream from UNIs to NNIs).

The memory 240 of the device comprises a plurality of storage locations that are addressable by the processor(s) 220 and the network interfaces 210 for storing software programs and data structures associated with the embodiments described herein. The processor(s) 220 may comprise necessary elements or logic adapted to execute the software programs and manipulate the data structures. An operating system 242 (e.g., the Internetworking Operating System, or IOS™, of Cisco Systems, Inc.), portions of which are typically resident in memory 240 and executed by the processor(s), functionally organizes the node by, inter alia, invoking network operations in support of software processes and/or services executing on the device. These software processes and/or services may comprise a loop-prevention process 244, a novel user-isolation process (e.g., forwarding engine/control) 246, as well as other processes (e.g., routing or switching/bridging processes, not shown). It will be apparent to those skilled in the art that other types of processors and memory, including various computer-readable media or hardware/software modules, may be used to store and execute program instructions pertaining to the inventive techniques described herein.

Loop-prevention process/services 244 contain computer executable instructions executed by processor 220 to perform functions provided by one or more loop-prevention such as the Resilient Ethernet Protocol (REP). (Note that while REP is one example loop-prevention protocol, others that are known to those skilled in the art may be used in accordance with the techniques herein, and REP is merely an illustrative example.) REP is a known protocol that provides fast convergence and loop avoidance, illustratively for open or closed ring topology networks, particularly for Ethernet and Layer 2 topologies. REP controls which ports/interfaces are blocked (in a blocking state) along the topology by exchanging protocol messages (packets) to determine the agreed upon topology, accordingly. In particular, REP is a segment protocol, defining directional forwarding to reach an aggregation (or aggregator) device "A." Once the topology has converged (MAC addresses learnt, etc.), subscriber traffic entering the access network 120 is thus forwarded in one direction only toward aggregation device A in order to reach the network 130 (WAN, etc.).

Transit nodes (devices 200) forward subscriber upstream traffic toward the NNI facing the aggregation device (e.g., an edge port), and not the NNI facing the alternate (blocked) port, where the directions of the ports are determined by REP. Further, as noted above, subscriber upstream traffic (traffic received on a UNI from a subscriber/user for entry into network 120/130) should not be forwarded to other UNI ports on the same device. On the other hand, subscriber traffic downstream traffic (coming from network 130 via aggregation device A to a subscriber/user) can be forwarded toward any UNI interface (e.g., where forwarding is based on MAC address entries in a MAC table stored on the device, not shown), or it can also be forwarded on the NNI interface towards the alternate port, e.g., to another access device for one of its UNI ports.

Additionally, when a failure occurs in the network (e.g., ring), REP adjusts the NNI states on each affected network device to account for the break in the network, ensuring that each network device still has connectivity to the aggregation device. Specifically, in certain situations, whether an NNI is facing toward the aggregation device or an alternate port (away from the aggregation device) may be switched on certain network devices in order to redirect traffic in the opposite direction for those affected devices. Particularly, for devices in a ring located between the link/node failure and a blocked port, traffic forwarding is reversed and upstream traffic should be sent only to the NNI facing the alternate port in the opposite direction around the ring than prior to the break.

As noted above, for security purposes, it is generally expected for traffic to be controlled in an access network so that subscriber-to-subscriber communication is prevented. While the UNI/NNI functionality isolates subscribers on a same network device 200, it is not appropriate for subscriber isolation across multiple devices. For example, referring again to FIG. 1, assume that a first user device 110 attempts to connect to a second user device 110 on switch C. Since both the first and second user devices are attached to UNIs, switch C can prevent their communication as described above. However, now assume that the first user device on switch C attempts to connect to a second user device on switch B. Because the traffic from the first user on switch C arrives on an NNI port of switch B, there is currently no mechanism to prevent the first user on switch C from communicating directly with the second user on switch B.

According to one or more embodiments of the disclosure, the UNI/NNI forwarding principle for data plane traffic may be expanded to isolate subscribers across multiple network devices (e.g., control plane traffic control may be disabled/ deactivated). For instance, based on the location of the alternate ports and the edge ports, certain traffic rules are applied to subscriber traffic that must be forwarded toward the aggregation devices as described herein. Specifically, to control traffic forwarding between NNIs corresponding to the links between two network devices, a novel distinct interface identification called an "NNI-ALT" (NNI alternate) is introduced. That is, by determining the NNI(s) for forwarding upstream traffic to the aggregation device A (e.g., the edge ports), those NNIs that are not used for forwarding upstream traffic (alternative ports) may be deemed a novel NNI-ALT.

Figure 3:
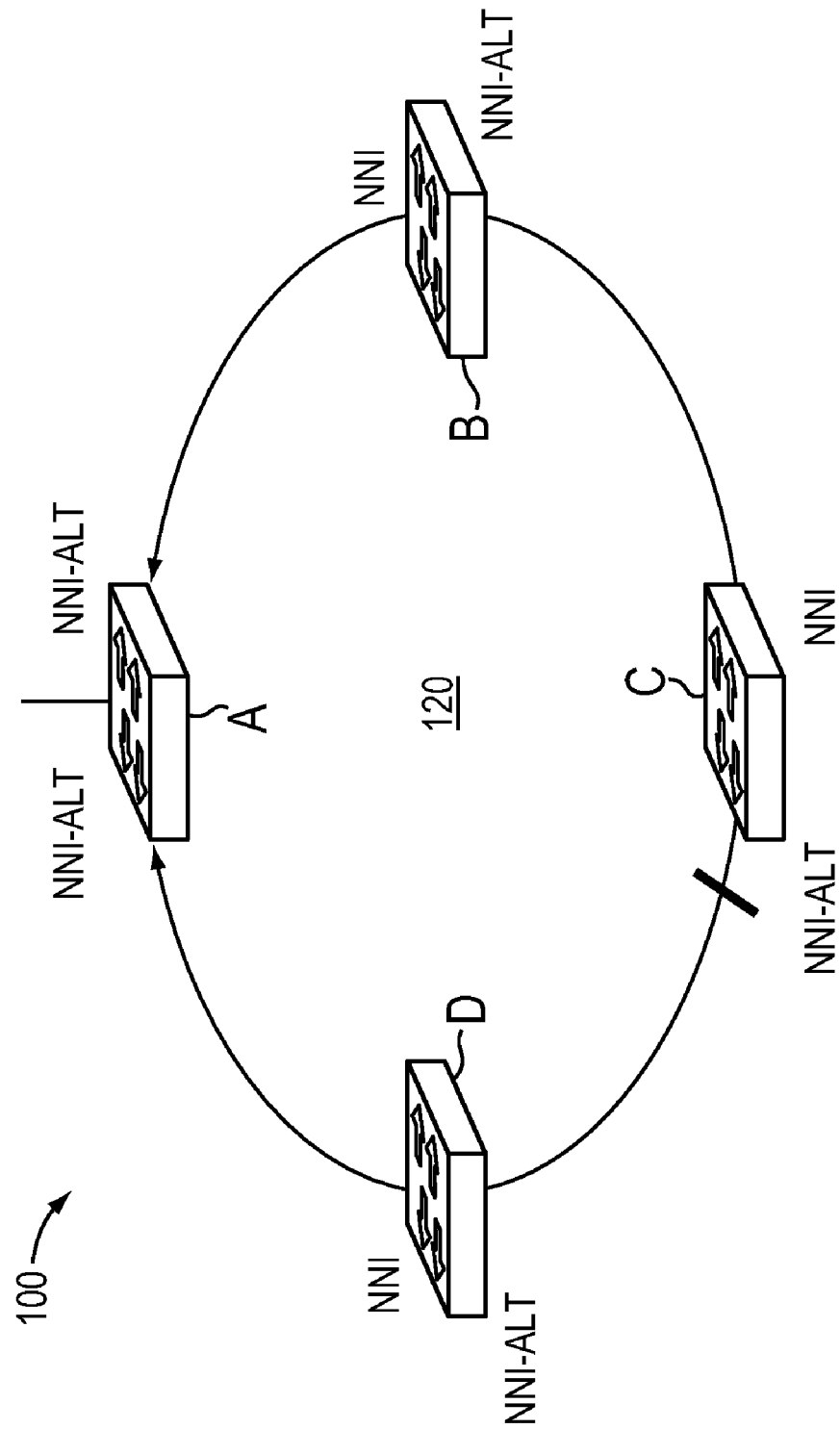
FIG. 3 illustrates an example computer network with NNI-ALTs in accordance with one or more embodiments herein.

FIG. 3 illustrates the example computer network 100 of FIG. 1 (without network 130 for clarity), where each of the NNIs is distinguished as either an NNI (212) or an NNI-ALT (214). For example, since the blocked interface is shown between network devices C and D in the ring topology, each port of each device facing away from the block and toward the aggregation device is an NNI, while those in the opposite direction (away from the aggregation device and toward the blocked interface) are NNI-ALTs (thus, NNI-ALTs always face the alternate port of the network devices).

Operationally, NNI-ALTs are treated as if they were a UNI for user traffic forwarding decisions, even though the NNI-ALTs are not actually facing a subscriber/user device. Specifically, the rules on each network device for traffic forwarding regarding the novel NNI-ALTs are as follows:

traffic forwarding between UNIs and NNI-ALTs on the device (i.e., from a UNI to an NNI-ALT or from an NNI-ALT to a UNI) is denied;

traffic forwarding between NNI-ALTs and NNI-ALTs on the device (i.e., from an NNI-ALT to another NNI-ALT) is denied; and traffic forwarding between NNIs and NNI-ALTs (i.e., from an NNI to an NNI-ALT or from an NNI-ALT to a NNI) is permitted.

(Notably, from a control plane perspective, the NNI-ALT port may be treated like an NNI, such that Layer 2 protocols are allowed to run on these interfaces: i.e., control plane protocol traffic forwarding is permitted between NNIs and NNIs, NNIs and NNI-ALTs, and NNI-ALTs and NNI-ALTs.)

Figure 4A:
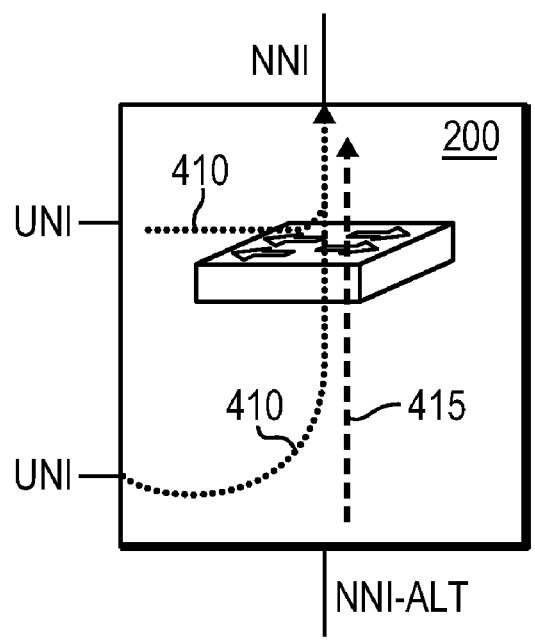
FIGS. 4A-B illustrate example traffic forwarding patterns for user isolation on a network device.
Figure 4B:
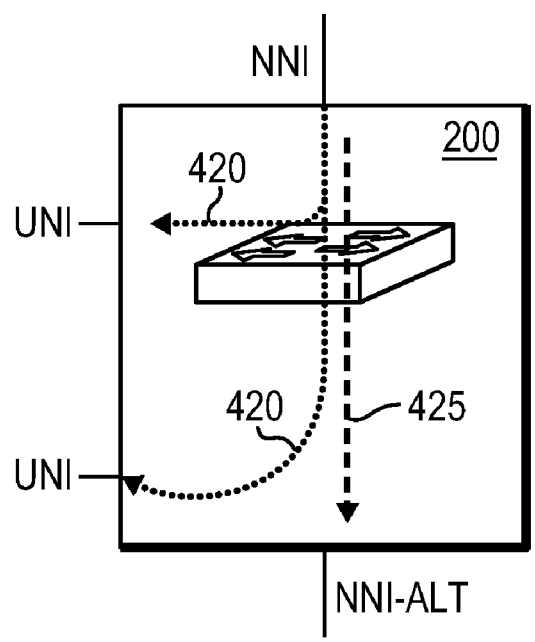

All other traffic forwarding remains the same, particular, traffic handling between UNIs and NNIs as detailed above. FIG. 4A illustrates an example traffic pattern of upstream traffic through a network device 200 (i.e., toward the aggregation device), while FIG. 4B illustrates an example traffic pattern of downstream traffic through a network device 200 (i.e., from the aggregation device). Specifically, in FIG. 4A, user upstream traffic 410 may be received from UNIs and forwarded only to an NNI (i.e., not an NNI-ALT). Network traffic 415 (from other network devices 200) received on an NNI-ALT may also only be forwarded to an NNI. Conversely, in FIG. 4B, user downstream traffic 420 (destined for a user/subscriber device 110 attached to the particular network device) may be received on an NNI and forwarded to an appropriate UNI. Further, network downstream traffic 425 (destined for another network device or a user/subscriber device for which another network device is responsible) may be received on an NNI and forwarded to an appropriate NNI-ALT.

Figure 5:
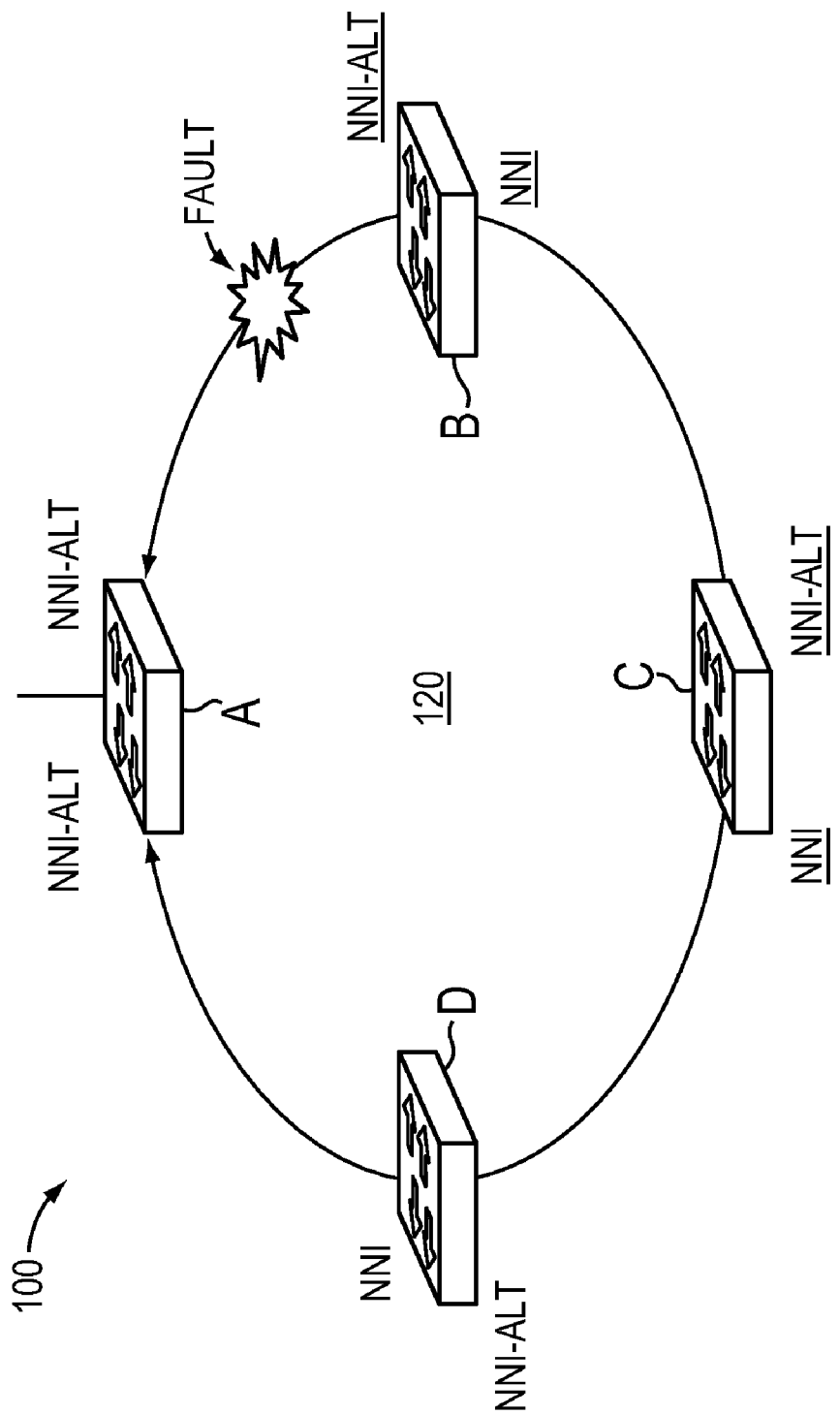
FIG. 5 illustrates an example computer network with a detected fault.

In the event of a link or node failure in the network (e.g., ring) 120, the NNI states are modified according to the loop-prevention protocol's convergence and corresponding new edge/alternate ports (toward/away from the aggregation device A). For example, as shown in FIG. 5, assume that the loop-prevention protocol (e.g., REP) detects a link failure between device A and B. REP messages may be sent from both ports detecting the failure, and as each network device has converged on the changed topology (e.g., each switch is on a segment), the locations of the alternate ports are adjusted accordingly. For instance, network devices B and C swap their NNI distinction (shown underlined) in order to forward traffic in the opposite direction around the illustrative ring to reach the aggregation device (and the port between device C and D is unblocked). Network device D, on the other hand, does not need to change its NNI distinctions, as its forwarding direction remains unchanged. In this manner, the determination of the NNI for forwarding upstream traffic (edge facing) may change in response to detection of a network fault by a loop-prevention protocol, and the NNI/NNI-ALT distinction may dynamically adjust correspondingly. Furthermore, once the failed link/node is repaired, re-convergence may (though need not) occur that moves the alternate facing ports back to their original position, and the NNI-ALTs may again be adjusted (e.g., once blocking is confirmed in the network to prevent loops).

Notably, physical ports of the network device 200 may have corresponding port states for each virtual local area network (VLAN) configured on the physical port. As such, the VLAN port states may be individually selected from an NNI, an NNI-ALT, and a UNI in a manner as described above for each corresponding VLAN (or groups of VLANs) on a particular port. Moreover, while a single aggregation device A is shown for simplicity, a plurality of aggregation devices may exist in the access network 120. As such, network devices may be configured to determine one or more active NNIs for forwarding upstream traffic to each aggregation device to provide support for such redundant aggregation layers (e.g., for Layer 3 Internet access, BRAS functions, subscriber policy functions, etc., as may be appreciated by those skilled in the art). For example, the multiple aggregation devices may terminate network segments (e.g., no longer a ring), or other arrangements may be made, such that, still, any NNI facing an aggregation device is an NNI, while any facing the alternate port is an NNI-ALT.

Figure 6:
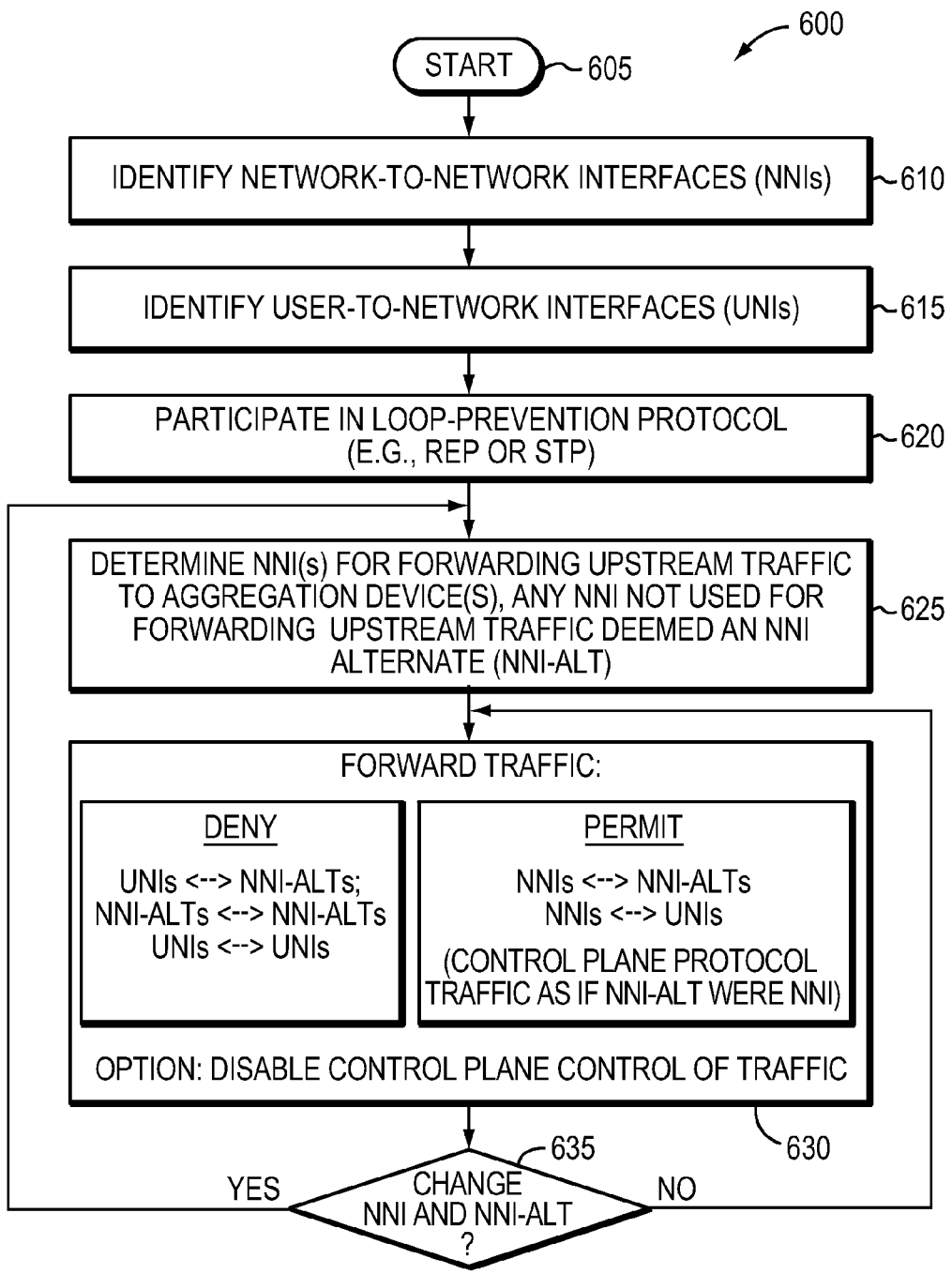
FIG. 6 illustrates an example procedure for user isolation.

FIG. 6 illustrates a simplified example procedure for providing user isolation between network devices in accordance with one or more embodiments described herein. The procedure 600 starts at step 605, and continues to step 610 and 615, where each network interface 210 of a particular network device 200 (e.g., "B") is identified as either an NNI 212 or a UNI 216, as described above. Also, the network device may be participating in a loop-prevention protocol in step 620, such as REP. Illustratively based on this loop-prevention protocol (though other techniques may be used), in step 625 the device may determine which NNI is to be used for forwarding upstream traffic to the aggregation device A, i.e., the NNI facing the aggregation device, and thus also deeming NNIs not used for forwarding upstream traffic as NNI-ALTs, as described above. (Note also, that as described above, physical ports may have a number of VLANs configured there, where a corresponding port state per each VLAN on a physical port may be selected from an NNI, an NNI-ALT, and a UNI, accordingly.)

Once the network interfaces (or VLAN port states) have been determined, in step 630 the network device may implement the forwarding rules described herein to isolate user traffic in the access network. For instance, the device may deny traffic between UNIs and NNI-ALTs, between NNI-ALTs and other NNI-ALTs, and between UNIs and other UNIs. Conversely, the device may permit traffic between NNIs and NNI-ALTs, as well as between NNIs and UNIs (as noted, NNI-ALTs may be treated as if they were NNIs for control plane protocol traffic). In addition, as mentioned above, control plane control of the traffic may, but need not, be disabled for the above traffic forwarding operation to function properly.

During the course of forwarding traffic through the device between the various types of interfaces, if an event occurs in step 635 that changes the determination of whether an NNI is an NNI-ALT, such as a loop-prevention protocol detecting a failure, thus re-assigning the interface facing the aggregation device A as described above. In this event, the procedure 600 returns to step 625 to correspondingly re-assign the NNI versus NNI-ALT identifications, and traffic may be forwarded accordingly.

Illustratively, the techniques described herein may be performed by hardware, software, and/or firmware, such as in accordance with a user isolation process 246, which may contain computer executable instructions executed by the processor 220 to perform functions relating to the novel techniques described herein, e.g., in conjunction with loop-prevention process 244 to determine ports facing the aggregation device A (edge ports) and those not facing the aggregation device (alternate ports).

The novel techniques described herein provide user isolation between network devices in a computer network (e.g., a ring topology subscriber network). By defining a new interface type, the NNI-ALT, as well as the forwarding rules associated therewith, the novel techniques provide subscriber isolation to not only a single device, but across the entire access network, and does so without the use of limitedly available PVLAN technology. Also, the dynamic aspects of one or more embodiments described herein, particularly the ability to adjust the NNI/NNI-ALT determination based on changing network topology, alleviate the need for cumbersome and inefficient manual configuration.

While there have been shown and described illustrative embodiments that provide LAN security by preventing users from communicating to each other in an access network (where user isolation is desired or required), it is to be understood that various other adaptations and modifications may be made within the spirit and scope of the embodiments described herein. For example, the embodiments have been shown and described herein for use with broadband LANs, particularly to closed ring topologies. However, the embodiments herein in their broader sense are not so limited, and may, in fact, be used with open rings, segments, trees, etc., so long as there is a concept of network ports versus user ports, and that the network ports are directional (e.g., have an "edge" or "alternate" identification) in that certain network ports face upstream toward an aggregation device (and receive downstream traffic from the aggregation device) while others do not. In addition, while REP is shown as an illustrative loop-prevention protocol, other suitable protocols may be used, such as a known spanning tree protocol (STP), where the aggregation device A is a root device of the STP. (In other words, network interfaces that face the root are "NNIs," while those that do not face the root port are "NNI-ALTs.")

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. An apparatus, comprising:
   a processor;
   a plurality of network interfaces, each of the network interfaces configured as one of either a network-to-network interfaces (NNI) or a user-to-network interface (UNI), wherein each NNI is configured to communicate with network devices in a first computer network and each UNI is configured to provide service to the first computer network for user devices; and
   a memory configured to store a process, the process when executed by the processor operable to:
      determine at least one NNI for forwarding upstream data plane traffic to an aggregation device of the first network that connects the first network to a second network, wherein any NNI that is not used for forwarding upstream data plane traffic is an NNI alternate (NNI-ALT);
      deny data plane traffic forwarding between UNIs and NNI-ALTs;
      deny data plane traffic forwarding between NNI-ALTs and NNI-ALTs; and
      permit data plane traffic forwarding between NNIs and NNI-ALTs.

2. The apparatus as in claim 1, wherein the process when executed is further operable to:
   deny data plane traffic forwarding between UNIs and UNIs; and
   permit data plane traffic forwarding between NNIs and UNIs.

3. The apparatus as in claim 1, wherein the process when executed is further operable to:
   change the determination of the NNI for forwarding upstream data plane traffic.

4. The apparatus as in claim 3, wherein the change is in response to detection of a network fault by a loop-prevention protocol.

5. The apparatus as in claim 1, wherein the process when executed is further operable to:
   permit control plane protocol traffic forwarding between: NNIs and NNIs; NNIs and NNI-ALTs; and NNI-ALTs and NNI-ALTs.

6. The apparatus as in claim 1, wherein the process when executed is further operable to:
   disable control plane control of traffic.

7. The apparatus as in claim 1, wherein the first network is a ring topology network.

8. The apparatus as in claim 1, wherein there is a plurality of aggregation devices in the first network, the process when executed further operable to determine at least one NNI for forwarding upstream data plane traffic to each aggregation device.

9. The apparatus as in claim 1, further comprising:
   one or more physical ports, wherein a corresponding port state per each virtual local area network (VLAN) configured on a physical port is selected from an NNI, an NNI-ALT, and a UNI.

10. The apparatus as in claim 1, wherein the process when executed is further operable to:
    participate in a resilient Ethernet protocol (REP) with the network devices in the first network.

11. The apparatus as in claim 1, wherein the process when executed is further operable to:

participate in a spanning tree protocol (STP) with the network devices in the first network, wherein the aggregation device is a root device of the STP.

12. A method, comprising:
identifying each of one or more network interfaces of a device as one of either a network-to-network interfaces (NNI) configured to communicate with network devices in a first computer network or a user-to-network interfaces (UNI) configured to provide service to the first computer network for user devices;
determining at least one NNI for forwarding upstream data plane traffic from the device to an aggregation device of the first network that connects the first network to a second network, wherein any NNI that is not used for forwarding upstream data plane traffic is an NNI alternate (NNI-ALT);
denying data plane traffic forwarding between UNIs and NNI-ALTs of the device;
denying data plane traffic forwarding between NNI-ALTs and NNI-ALTs of the device; and
permitting data plane traffic forwarding between NNIs and NNI-ALTs of the device.

13. The method as in claim 12, further comprising:
denying data plane traffic forwarding between UNIs and UNIs of the device; and
permitting data plane traffic forwarding between NNIs and UNIs of the device.

14. The method as in claim 12, further comprising:
changing the determination of the NNI for forwarding upstream data plane traffic.

15. The method as in claim 12, further comprising:
permitting control plane protocol traffic forwarding between: NNIs and NNIs; NNIs and NNI-ALTs; and NNI-ALTs and NNI-ALTs of the device.

16. The method as in claim 12, further comprising:
selecting, for one or more physical ports of the device, a corresponding port state per each virtual local area network (VLAN) configured on a physical port, the port state selected from an NNI, an NNI-ALT, and a UNI.

17. The method as in claim 12, further comprising:
participating in a resilient Ethernet protocol (REP) with the network devices in the first network.

18. A tangible computer-readable media having software encoded thereon, the software when executed operable to:
identify each of one or more network interfaces of a device as one of either a network-to-network interfaces (NNI) configured to communicate with network devices in a first computer network or a user-to-network interfaces (UNI) configured to provide service to the first computer network for user devices;
determine at least one NNI for forwarding upstream data plane traffic from the device to an aggregation device of the first network that connects the first network to a second network, wherein any NNI that is not used for forwarding upstream data plane traffic is an NNI alternate (NNI-ALT);
deny data plane traffic forwarding between UNIs and NNI-ALTs of the device;
deny data plane traffic forwarding between NNI-ALTs and NNI-ALTs of the device; and
permit data plane traffic forwarding between NNIs and NNI-ALTs of the device.

19. The tangible computer-readable medium as in claim 18, wherein the software when executed is further operable to:
deny data plane traffic forwarding between UNIs and UNIs of the device; and
permit data plane traffic forwarding between NNIs and UNIs of the device.

20. The tangible computer-readable medium as in claim 18, wherein the software when executed is further operable to:
change the determination of the NNI for forwarding upstream data plane traffic.

21. The tangible computer-readable medium as in claim 18, wherein the software when executed is further operable to:
select, for one or more physical ports of the device, a corresponding port state per each virtual local area network (VLAN) configured on a physical port, the port state selected from an NNI, an NNI-ALT, and a UNI.

* * * * *